(12) United States Patent  
Verrilli

(10) Patent No.: US 7,190,891 B2  
(45) Date of Patent: Mar. 13, 2007

(54) HEATING-COOLING SYSTEM FOR A NOZZLE

(76) Inventor: Brian Leonard Verrilli, 7407 Brava St., Carlsbad, CA (US) 92009-7502

(*) Notice: Subject to any disclaimer, the term of this patent is extended or adjusted under 35 U.S.C. 154(b) by 312 days.

(21) Appl. No.: 10/760,014

(22) Filed: Jan. 17, 2004

(65) Prior Publication Data

US 2005/0158042 A1     Jul. 21, 2005

(51) Int. Cl.  
*F24H 1/10* (2006.01)
(52) U.S. Cl. ....................... 392/478; 392/388
(58) Field of Classification Search ................ 392/478, 392/388, 484  
See application file for complete search history.

(56) References Cited

U.S. PATENT DOCUMENTS 3,722,821 A * 3/1973 Jaeger et al. ............... 239/133

6,220,850 B1 * 4/2001 Catoen et al. ............... 425/549

* cited by examiner

*Primary Examiner*—Thor S. Campbell

(57) ABSTRACT

A novel nozzle heater design, that facilitates fast thermal response on demand, to achieve rapid reduction in viscosity, allowing fluid to flow through the exit aperture of the nozzle with less pressure, reduced surface tension and elastic behavior at break off. A rapid cool down after a temperature spike alleviates problems associated with prolonged exposure of the fluid at temperature. Prolonged exposure manifests the following problems: volatiles are driven off, premature cross-linking is initiated and fluid in the heated region is subsequently ruined. The fluid path heater is designed to prevent the occurrence of these problems by virtue of the exceptionally fast thermal response rate. This heater design requires no fasteners and is simple to assemble; parts are held in place by inherent geometric relationships and connection to the nozzle hub is tool-less and self-compensating for tolerance variation in the nozzle hub to which it is connected. The heater lowers cost by improving the productivity of the fluid dispensing system on which it is installed.

20 Claims, 9 Drawing Sheets

HEATING-COOLING SYSTEM FOR A NOZZLE

CROSS REFERENCE TO RELATED APPLICATIONS

Related application Ser. No. 09/828,621, Filed Apr. 6, 2001, Now Patent Pending. Related application Ser. No. 10/319,906, Filed Dec. 16, 2002, Now Patent Pending. Related application, Ser. No. New, Filed Nov. 11, 2003, Now Patent Pending.

FEDERALLY FUNDED RESEARCH

Not Applicable

SEQUENCE LISTING OR PROGRAM

Not Applicable

BACKGROUND OF INVENTION—FIELD OF THE INVENTION

This invention pertains to the field of liquid dispensing equipment. More particularly, it pertains to a novel heater that can be connected to a nozzle hub. The nozzle heater provides a positive locking, tool-less connection to the nozzle hub that is separable and serviceable. A nozzle heater applies heat by conduction through the flat base of the hub via an electrical element and cools convectively along the faces of the hexagonally shaped nozzle hub. It compensates for variations in tolerance of the nozzle hub by changing the elevation of the element to insure intimate contact of the flat nozzle hub base with the flat surface of the element. Institution of this approach to nozzle heater design can realize a large gain in dispensing system performance in contrast to competitive devices.

BACKGROUND OF INVENTION—DESCRIPTION OF THE PRIOR ART

Viscous fluids resist flow through a small diameter exit aperture; therefore, more force is required to act over an area to substantially increase pressure enough to induce flow. Needle or nozzle heaters are used to provide a source of thermal energy to nozzles that contain fluids which experience substantial reduction in viscosity with application of heat. The initial reduction in fluid viscosity is temporary; prolonged exposure to a heated environment ultimately drives off volatiles, causes premature cross-linking and ruins the fluid in the heated region.

The current practice in the industry is to expose the fluid path to an elevated temperature continuously, which causes no adverse effect as long as fluid under steady state conditions has no reduction in rate of flow through the heated region. Generally, two different methods of heat application are used to accomplish this: Method (1) a heater is clamped to the nozzle or needle exterior; Method (2) a metallic fitting is placed in-line between the output port of a pump and the nozzle inlet for use as a heater connection point. Method (2) is employed when the nozzle used is not made of metal or other suitable material known to be a good agent of heat transfer. Testing and observation have demonstrated, through statistical modeling of a wide variety of nozzle heating devices, the best solution is to heat the nozzle hub Method (1).

In an automated environment, movement by translation in the Z direction tends to generate a torque in the counter clock-wise direction and loosens the nozzle. Repetitive motions like these also fracture individual conductors in the cabling that are used for connection of power and sense of temperature by the controller. Although, heater sensor cable life varies in proportion to the frequency of movement it sees in service in a particular application, failure obeys Miner's Law (each repetition is equal to 1/n cycles, failure occurs at n); the frequency of n has the biggest impact on thermocouple cable life. RTD or resistance temperature detectors can be used these devices are much less sensitive to cabling problems. They would have much greater life in contrast to thermocouples, but the initial cost is greater. Thermocouples are still in greater use in the industry. Current practice in the industry is to replace the entire heater when a conductor in a cable is broken.

A heater that is in widespread use in the industry is constructed from a block of aluminum that is 38 mm×15 mm×5 mm and has a 100-ohm resister imbedded within a counter-bore. The resistor is placed face down in the bore against the thin anodized section. The block interior has a circular bore through the section; it mates against a cylindrically shaped nozzle hub or an adapter placed inline. The device is usually secured by means of a thumbscrew. This type of heater also is made with a modified vee-shape cavity with a thumbscrew at the opposite end. The resistor is embedded in epoxy at the apex of the vee-shape cavity and the thumbscrew pushes the wall of a conventional tube type stainless steel nozzle against the resistor. In either case, the contact area against a source of heat is directly proportional to the conductive rate of heat transfer through the surface. The transfer rate is severely impacted when the area is small. Heat must transfer from the cylindrical resistor in contact with the flat surface of the counter bore bottom to the opposite side and into the stainless steel hypodermic tubing, nozzle hub or inline adapter. This is line contact on each side of the counter bore at best. The rate of change for an energy pulse is very slow. A large thermal mass compared to the contact area, must be heated to affect a change in temperature.

BACKGROUND OF INVENTION—OBJECTS AND ADVANTAGES

Accordingly, the design of the fluid path heater has inherent objects and advantages that were not described earlier in my patent. Several additional objects and advantages of the present invention are:

(1.) To provide a design for a heating device that requires no tools to install or remove on a hub.

(2.) To provide a design for a nozzle or needle hub that clamps the heater tightly to the hub with the necessary force to withstand any strong movement, but allows rotation so as not to exert any torque that could loosen the hub and cause process interruption from tip loosening.

(3.) To provide a design for a nozzle or needle hub that encloses or contains the space surrounding the nozzle in an environment that stops the effect of external influences on change in temperature.

(4.) To provide a design for a nozzle or needle heater element that can be produced, using thermally efficient, conductive metals. Aluminum Al is the best candidate because the oxide form $Al_2O_3$ is not electrically conductive, but is thermally very efficient. The oxide layer is deposited on the surface of an aluminum part by a process known as anodization. Various grades exist; however, the most resistant form to abrasive wear is referred to as hard anodization in the industry.

(5.) To provide a design that is capable of transforming electrical energy into thermal energy without electrically overloading the resistive element; and, enable plug in installation into existing systems to proliferate the use of the technology in the industry.

(6.) To provide a design that compensates for variation in height of the nozzle hub so intimate contact between the flat base of the hub and the flat heated face of the element always, occurs.

(7.) To provide a design for an element that has exceptionally small thermal mass to elicit a rapid response rate for a given thermal cycle. Element temperature can be kept elevated above ambient but lower than the so the fluid path experiences a smaller delta temperature with each thermal cycle. The thermal reservoir in the heating system resides within the nozzle hub.

(8.) To provide a design, wherein no fasteners are used in the assembly, parts are held in place by inherent geometric relationships, there are no threaded fasteners to loose.

(9.) To provide a design with a replaceable cable for connection of power and multiple outputs for sense of temperature.

(10.) To provide a design that uses rods instead of wires within the assembly for sense of temperature or transmission of electrical power.

(11.) To provide a design that has a small diameter and a thickness less than a US dime, thermal mass is minimized to enable rapid thermal response to energy input.

(12.) To provide a design for an electrical heating cartridge that can supply cooling gas across the faces of a hexagonally shaped nozzle hub for convective transfer of heat out of the system.

(13.) To provide a design that has the provision for multiple temperature outputs for comparison, validation and/or monitoring.

(14.) To provide a design that can seal off against fluid migration in the event of pump, valve or operator malfunction. This is accomplished using a silicone washer clamped in place around the entrance to the nozzle heater. The tight fitting inside diameter of the elastomer stretches around the circumference of the nozzle hub at the entrance of the heater bore sealing the assembly.

SUMMARY OF THE INVENTION

The invention is a novel design of such a nozzle heater for heating the fluid path to reduce the viscosity of the fluid or cool the fluid path to reduce the effect of cross-linking when the flow-rate of fluid through the path is equal to zero. Fluid that is forced through a nozzle or needle made to fit to a standard valve (Luer or Luer lock type) and attached to a hose leading from a pump that is connected to a reservoir of liquid. A nozzle heater-cooler comprises.

A spring biased cylindrically shaped cartridge containing a thin circular resistive element with a hole concentrically located on center forming a base for application of heat to a nozzle hub. The cartridge is pushed upward by a spring and enables a change in altitude when sufficient force is applied to cause deflection. The spring pushes against the outside lip, which extends around the cartridge in a radial fashion providing a basis for contact. Both cartridge and spring reside within a cylinder large enough for containment of both parts. This cylinder is constructed with a concentric hole large enough to allow the cartridge to freely pass through and small enough to give support to the spring around the perimeter. The cartridge is pushed into a guillotine type slide with an elliptical hole on the centerline along the longitudinal axis and through the cross section large enough to allow a nozzle hub to pass through but small enough to prevent egress of the spring biased cylindrically shaped cartridge. The guillotine type slide is fit into a slot placed perpendicular to the axis of the cylinder that contains both spring and cartridge. Once through the slot, the slide is prevented from further movement by an abutment that protrudes from each side, the end of the slide that passes through is fit with a small diameter spring large enough to span the slot. The spring provides the force to push against the elliptical hole and force the slide against abutments that protrude from either side biasing the slide to one end of the travel, forcing it into a normally closed position. Against abutments present in the larger cylinder.

The guillotine style slide locks into a concentric circumferential groove located on the nozzle hub exterior directly above the 5/16 or 8 mm hex used to apply torque for installation and removal. This is a notable feature due to the ability of the device to secure itself to the nozzle hub with the necessary amount of force to withstand any strong movement but allow rotation so as to not exert any torque that could loosen the nozzle. Compression of the slide exposes an opening of sufficient size to insert the hub and nozzle assembly through. Positioning the nozzle inside the device and sliding the housing upward compresses a spring to position the heater element housing assembly so that it is pushing flat against the hub base or fund-us until the slide extends into a groove provided in the hub that positively locks the assembly. Variation in hub height is compensated in the heater-cooler by movement of the cartridge assembly that contains the element and housing.

Accordingly, the main object of this invention is a novel nozzle heater-cooler that can be removed from the nozzle hub with no tools, requires no tools to assemble or disassemble and can be easily serviced. Each sub-assembly is easily removed and replaced. A unique heating device, approximately the size of a quarter, enables a control system to spike the temperature at the instant of dispensing to reduce viscosity, allowing fluid to flow through the exit aperture with less pressure, reduced surface tension and elastic behavior at break off. What is noteworthy and equally important is a rapid cool down after a temperature spike. Prolonged periods of exposure of fluid at temperature can drive off volatiles, initiate cross-linking prematurely and ruin the fluid in the heated region for deposit on the substrate. This heater prevents these problems and meets the stringent requirement for the fluid string to behave plastically and snap back to the dispensing point, not string or pull apart like Turkish taffy, and works in concert with the nozzle, achieving precise control of the environment surrounding the nozzle. Heat is introduced conductively through the flat bottom surface of the hub. Cooling occurs convectively along each face of the hexagonal geometry.

The hub to which the heater-cooler is attached is designed for use in a heated application and contains a high percentage of copper. Currently, two designs exist for the hub. The concept behind each design is different, according to the sensitivity of the dispensing process to the thermal response rate. Initially, hubs were brazed to the core enabling fast heat transfer from the hub to the core. This design trades increased cost for superior advantage in thermal response rate.

The nozzle heater-cooler reduces cost to the consumer by allowing the systems on which it is used to be more productive at higher levels of performance, reducing waste and permits the systems that require its use to be made more economical and more useful in the relevant industry. These and other objects of the invention will become clearer when one reads the following specification, taken together with the drawings that are attached hereto. The scope of protection sought by the inventor may be gleaned from a fair reading of the claims that conclude this specification.

DESCRIPTION OF THE DRAWINGS—FIGURES

Turning now to the drawings wherein numbers identifies elements and like elements are identified by like numbers throughout the nine figures, the novel design of a nozzle heater-cooler 1 is depicted in FIGS. 1, 2 and 4–8.

Figure 2:
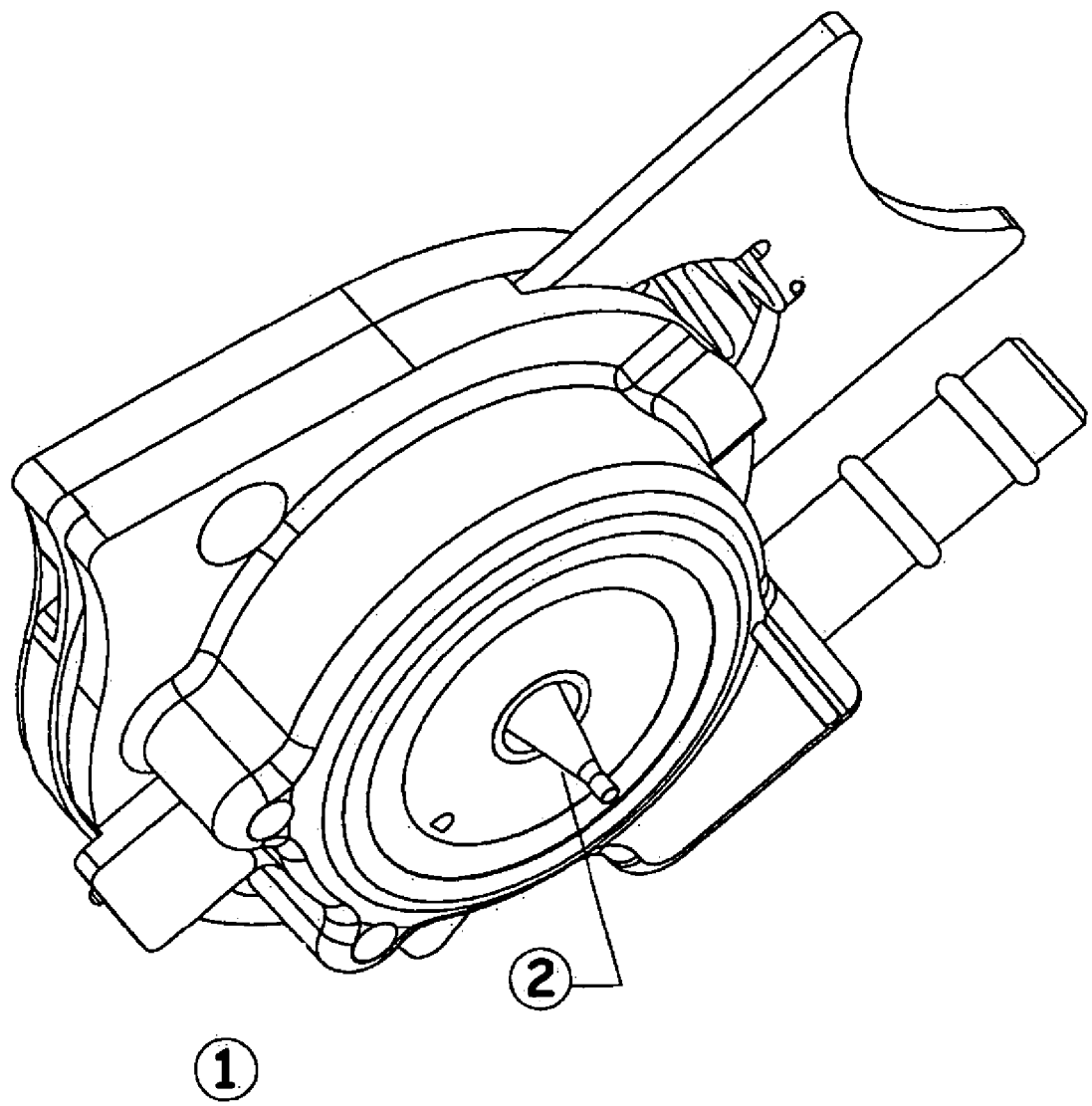
FIG. 2 is an illustrative view of the underside of the invention also at a scale of 4:1.
Figure 3:
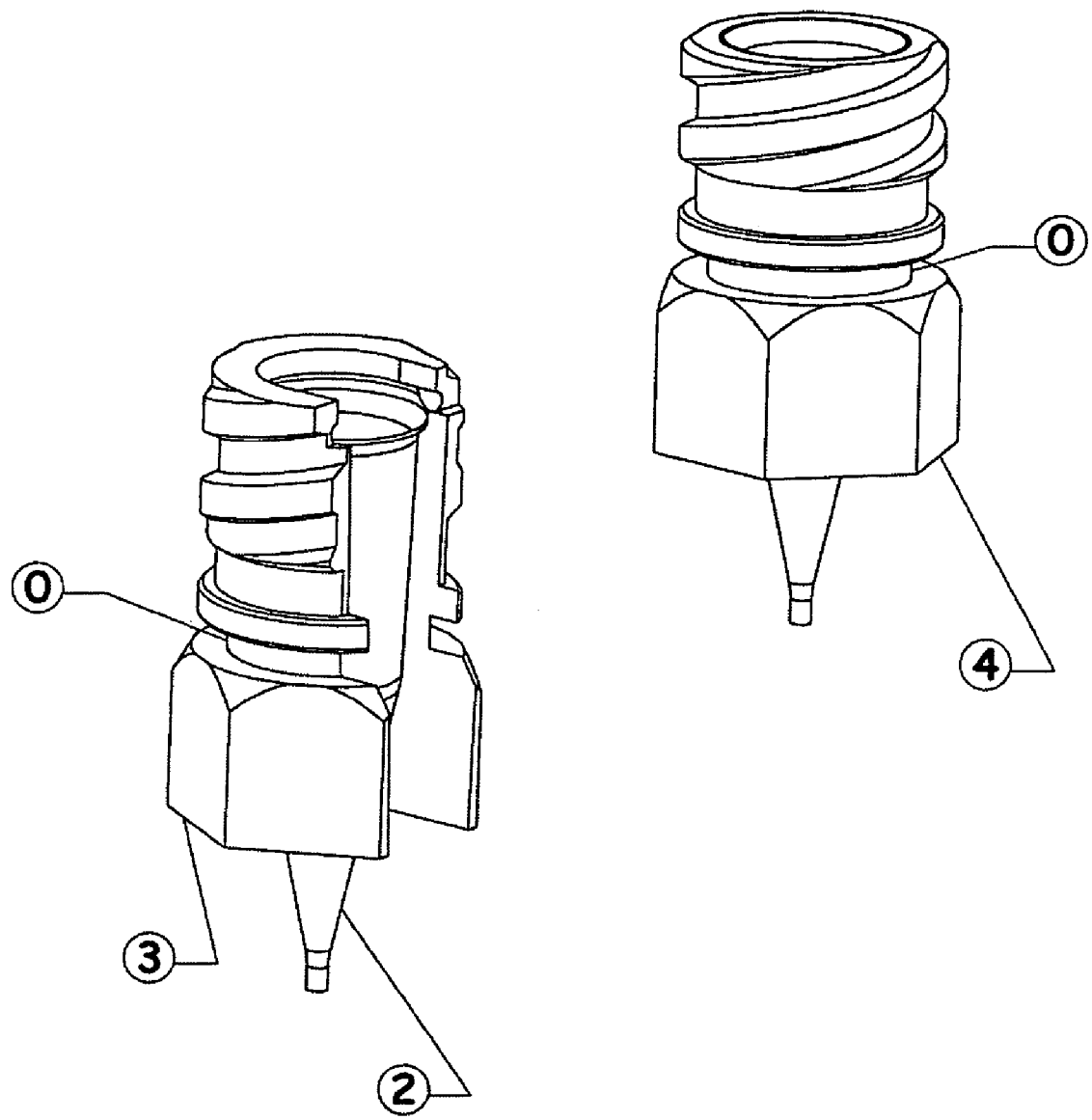

FIG. 3 at an approximate scale of 5:1 is an illustration of nozzle designs used with the nozzle heater-cooler. The pictorial FIG. 3 shows the hub groove 0 the attachment position for the heater cooler assembly for different nozzle types or versions. The reusable hub 3 and disposable nozzle core 2 are installed in the nozzle heater-cooler illustrated in FIGS. 1 and 2. The brazed one-piece nozzle 4 is another alternative nozzle configuration that can be used in the nozzle heater-cooler. Generally, when increased cost over the disposable core 2 and reusable hub 3 is not an issue and the application demands the increased thermal performance.

Figure 1:
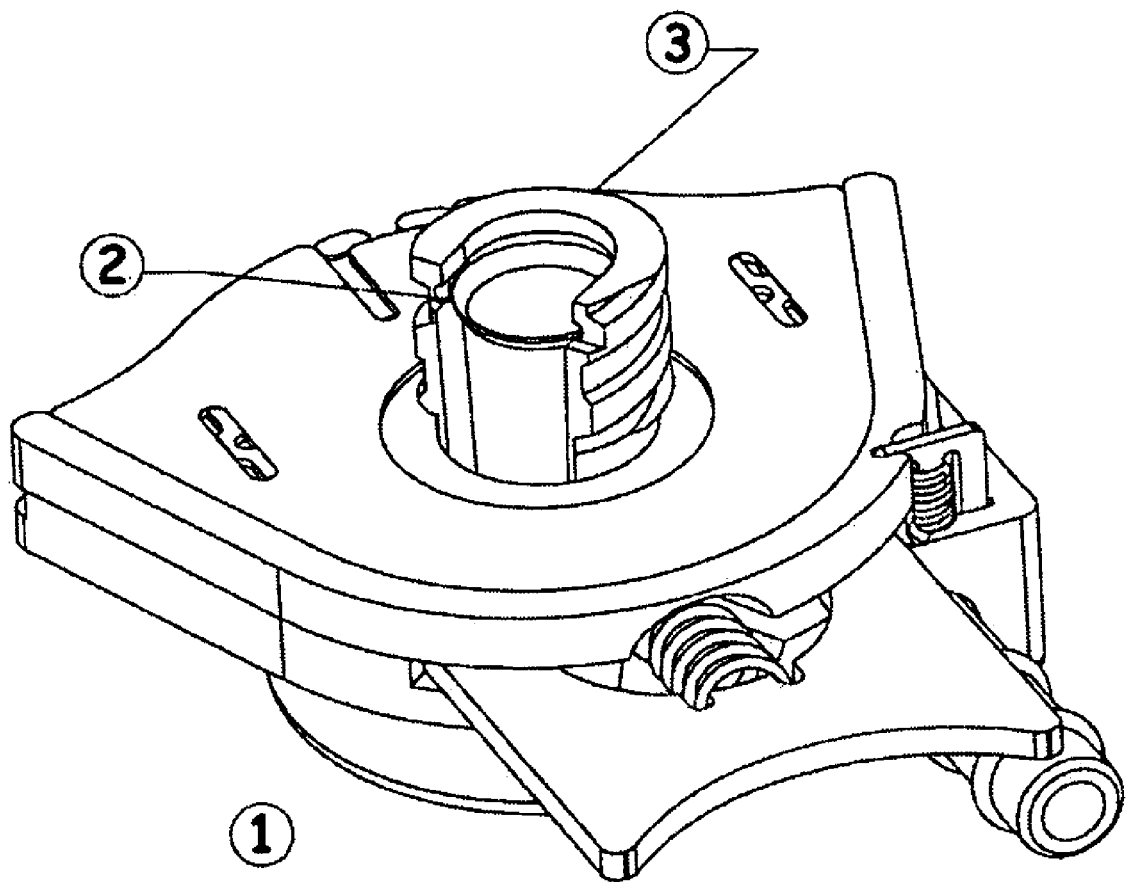
FIG. 1 is an illustrative view of the invention from an elevated vantage point at a scale of 4:1.
Figure 4:
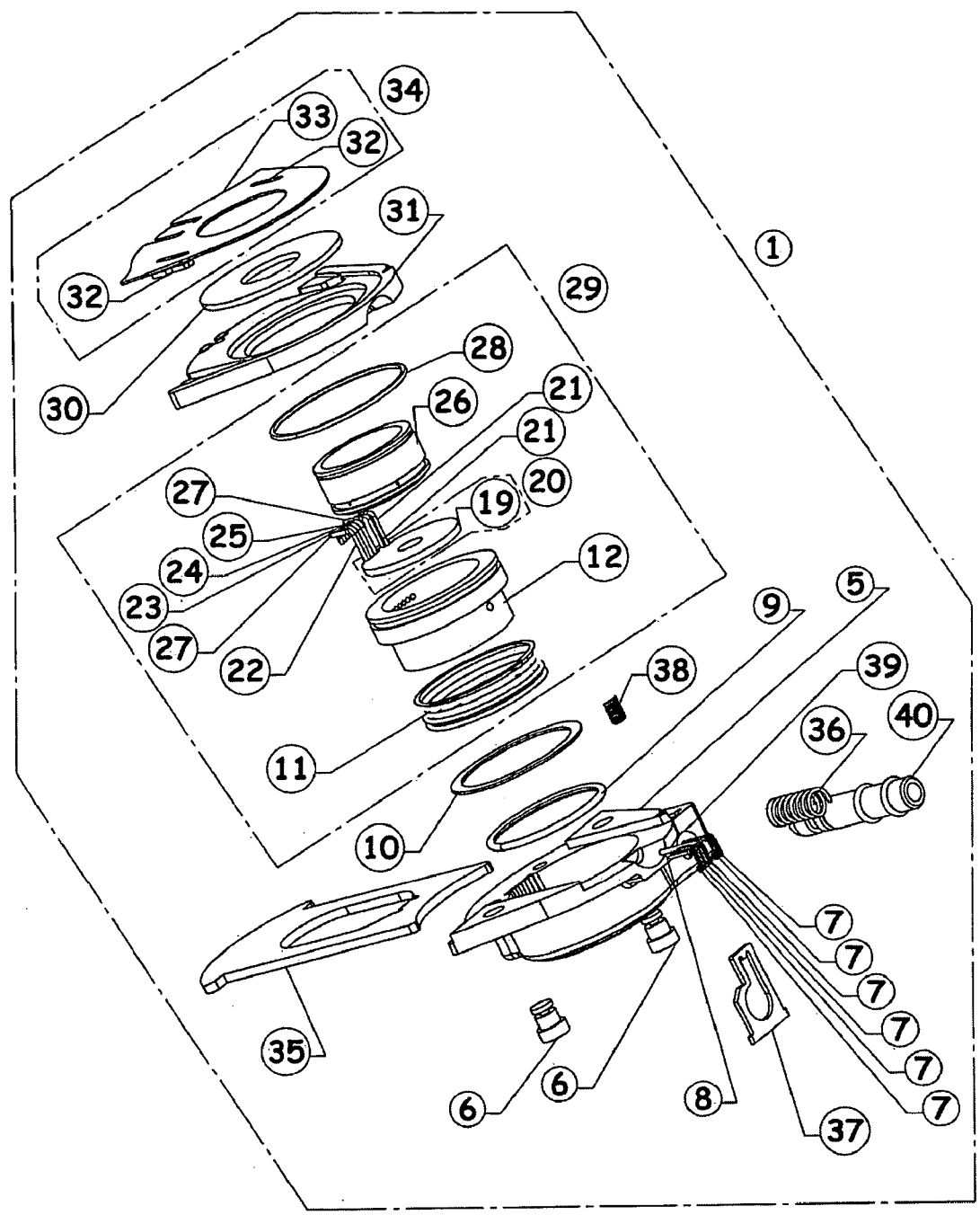

FIG. 4 is an illustrative exploded view of the details that comprise the invention shown in FIGS. 1 and 2 the parts in the drawing are at an approximate scale of 2:1.

Figure 5:
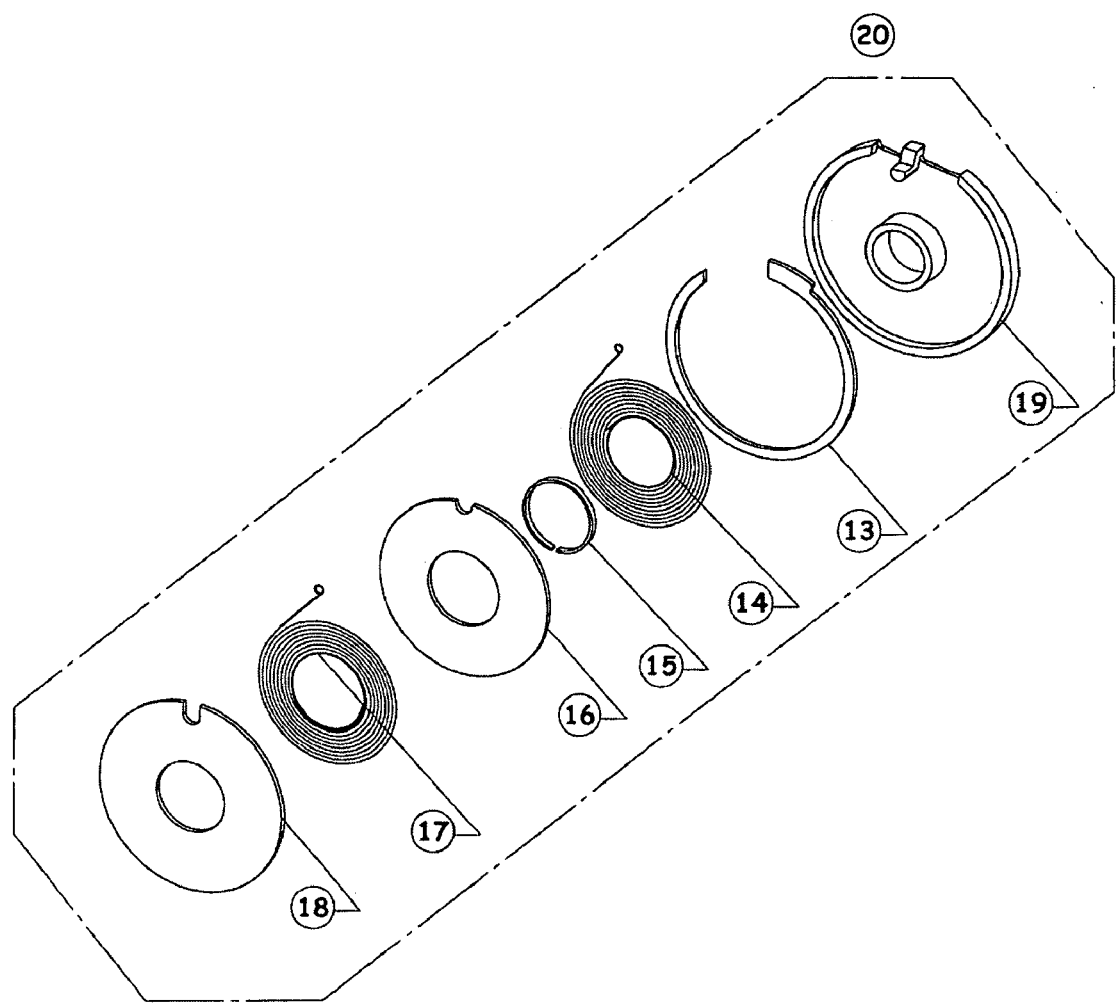

FIG. 5 is an exploded view of the heater element assembly 20 at an approximate scale of 5:1, construction of the assembly requires the element housing 19 with resistive elements 14 and 17 and thermocouple contact pad 13 with electrically insulating spacers 16, 18 to separate the resistive elements 14 and 17, the contact ring 15 is the means for connection of the two resistive elements 14 and 17 which lay on parallel planes connected in series.

Figure 6:
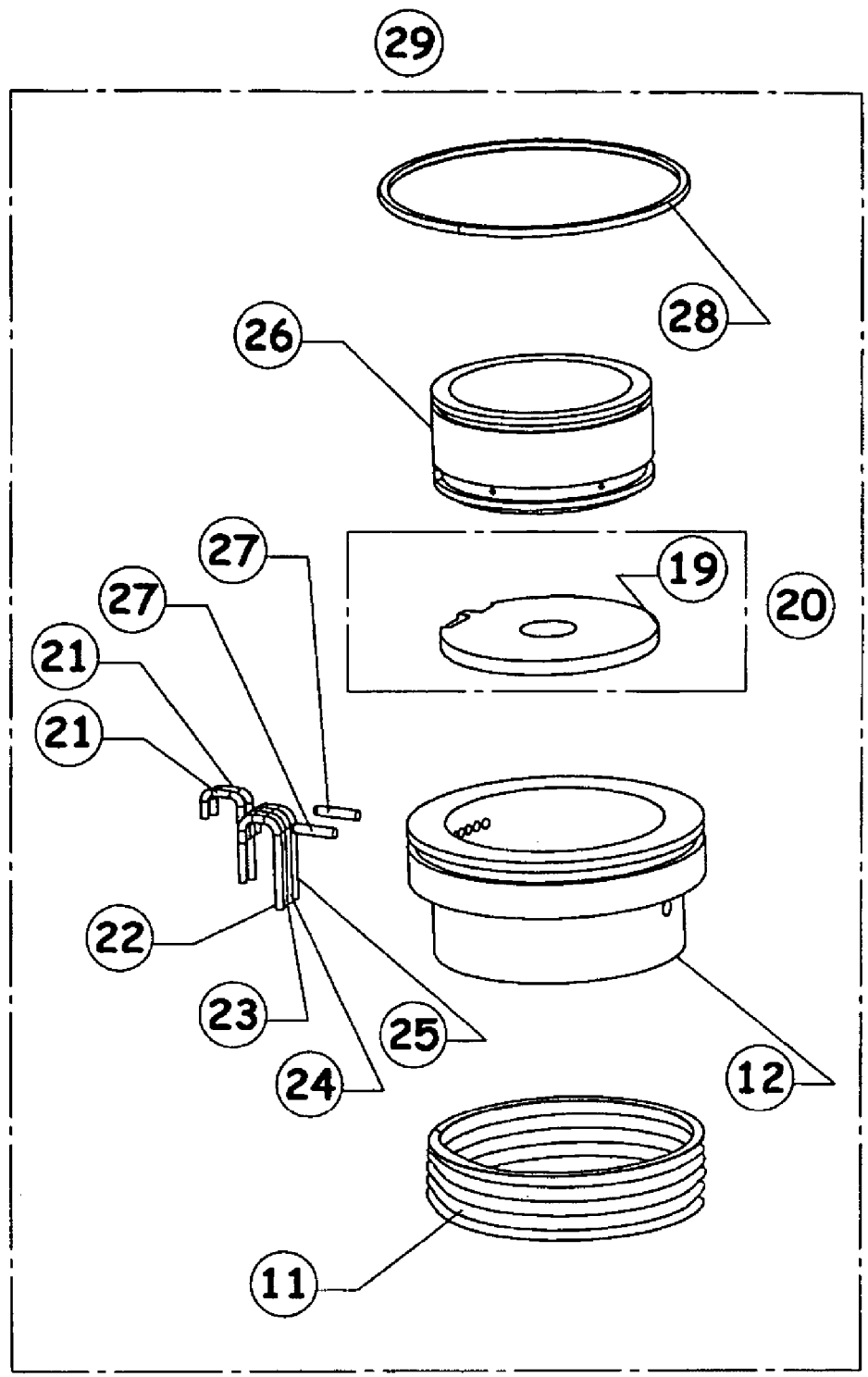

FIG. 6 is an exploded view of components assembled to construct the heater-cooler cartridge 29 at an approximate scale of 3:1, depicting thermocouple 22, 23, 24, 25 and power connection rods 21, which are normally shrouded by the diffuser 26 when assembled.

Figure 7:
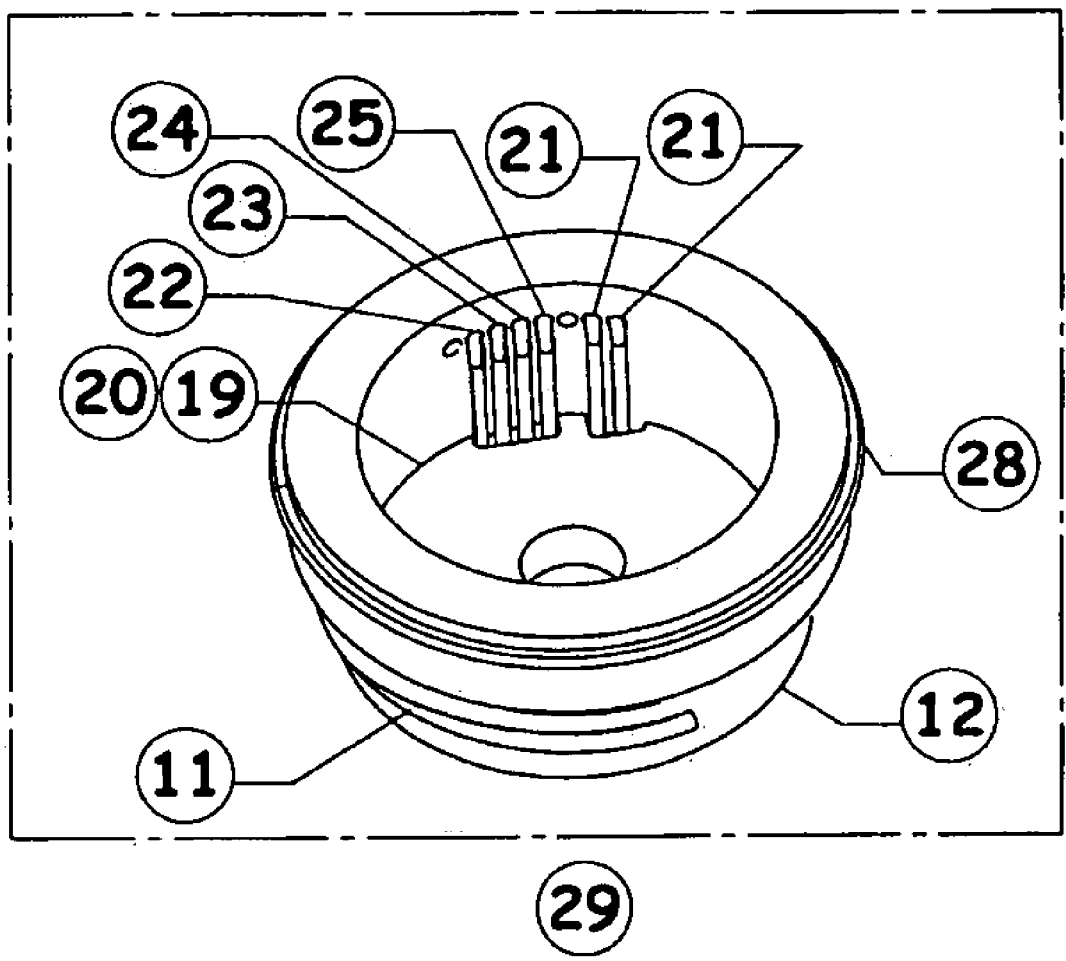

FIG. 7 is an illustrative view of related heater-cooler cartridge 29 parts. The view is from a vantage point elevated above the cartridge assembly at an approximate scale of 3:1 and omits the diffuser 26 to see the thermocouples 22, 23, 24, 25 and power connection rods 21 installed in their respective in service positions.

Figure 8:
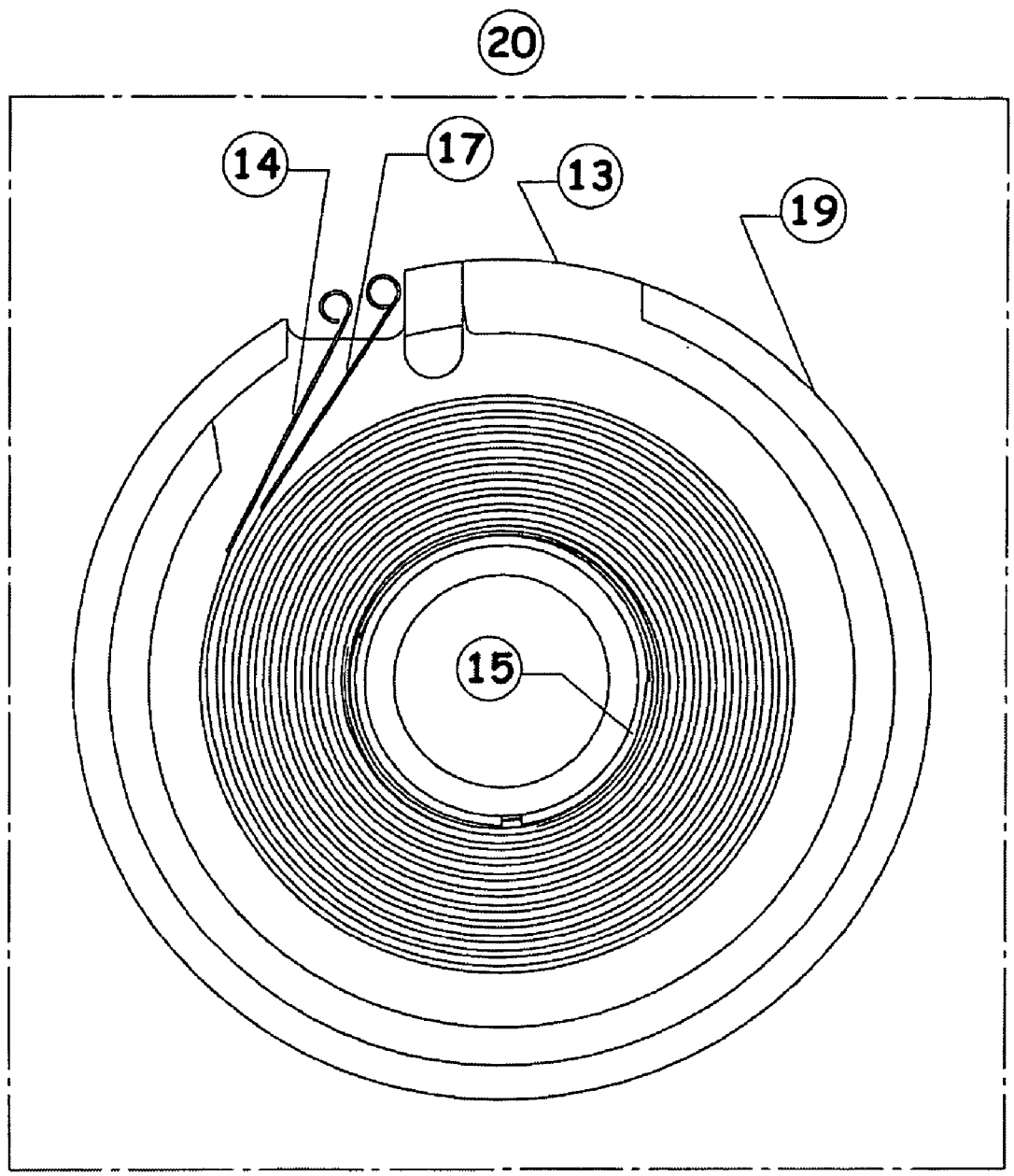

FIG. 8 illustrates a view from an elevation above the resistive element looking straight down on both. It is easy to see with no spacers installed the two resistive elements have the same pitch but, start out of phase by 180°; this allows the winding of element two 14 to be located between windings of element one 17 in the element housing designed for containment of the fragile element windings 14, 17.

DESCRIPTION OF THE PREFERRED EMBODIMENT

Figure 0:
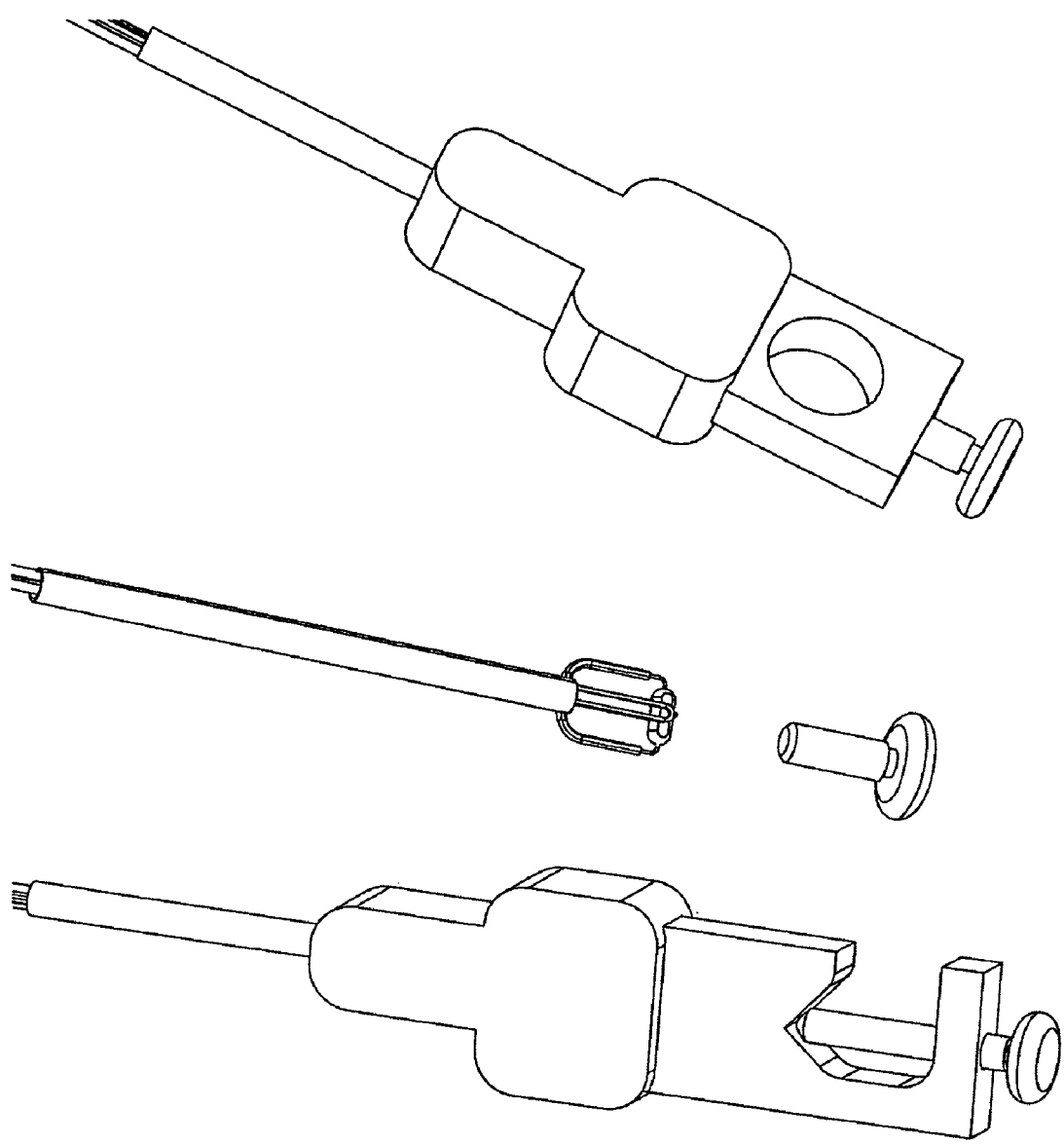
FIG. 0 is an illustrative view at 2:1 of the Prior Art; two versions of the same style heater are shown as well as an illustration of the interior electrical components present in the devices.

Referring now to the drawings wherein the showings are for the purpose of illustrating preferred embodiments of the invention only and not for the purpose of limiting it. FIG. 0 Prior Art nozzle heaters used for resistive heating. The first version fits around the hub using a thumbscrew. It is the first image in FIG. 0. The second version clamps around syringe tube type nozzles that are the lower most images of the three. The center view is an image of the internal electrical components that are the basis for the function. It is simply a 100 Ω resistor and a thermocouple. This is the configuration in use by this industry to heat the nozzle fluid path. All versions have the same electrical configuration, the components are inserted into the aluminum housing and insert molded using an elastomer.

The inventive nozzle heater 1 is depicted in FIG. 1, in vertical or near vertical attitude. The invention is a novel design for a nozzle heater-cooler 1 that enables tool-less removal for nozzle, and or nozzle core replacement. It is preferred that the nozzle heater-cooler 1 be made a unit that surrounds and insulates the nozzle core 2 and nozzle hub 3 from contact with thermal influences in the outside environment. A reusable nozzle hub 3 and disposable core 2 are shown essentially encased in the inventive nozzle heater-cooler 1 of FIGS. 1 and 2; the invention as seen in FIG. 1 illustrates the elastomer seal 29 integrated into the upper body FIG. 4, 31 to prevent fluid migration into the assembly in the event the pump or operator malfunctions. It also functions to vent gas from convective cooling to the side along the axis of the main slide 35; the gas exit is on the slide spring 36 side of the assembly. FIG. 3 is a view of the reusable hub 3 and disposable core 2 and the brazed nozzle 4 that are used with the heater-cooler 1. The circumferential groove 0 used to fasten the heater-cooler to the hub can be seen in FIG. 3, located directly above the hexagonally shaped lower section. FIG. 5 is a view of one of the three sub-assemblies that make up the inventive nozzle heater-cooler. This exploded view illustration is the heater element housing sub-assembly. The assembly contains seven parts, the element housing 19 is orientated bottom side down the heated side faces into the paper. It is an anodized part that forms the structure for the more fragile parts that are assembled into it. The first part installed is the thermocouple contact pad 13, which is die cut preferably from copper sheet 0.015 in.–0.020 in. thick or an alloy high in copper content. The first element 14 is placed inside the thermocouple contact pad 13 and orientated according to FIG. 5. A small amount of grease between the element winding 14 performs several functions; first, it is a means of locating the element winding 14 temporarily, second, it removes the gas layer from around the element winding 14 and provides the necessary resistance to build up of oxide on the element winding 14 surface over time. The contact ring 15 is placed around the hollow cylindrical protrusion extending from the center of the anodized housing 19 the contact ring 15 traps the element winding 14 so contact between element windings 14, 17 on the two parallel planes can be achieved. The second element winding 17 is attached to the top of the first spacer 16 with grease the inner connection is made via the contact ring 15 when the spacer plate is pressed on top of the first element the inside bore of the plate traps the ends of the first of two windings in compression via the copper contact ring 15 to make the electrical connection. This places the resistive elements into a series connection in order to sum resistances enabling a target value for resistance in ohms to be achieved in the small package size. The first anodized aluminum spacer plate 16 is pressed on top of the element winding 14 trapping the contact ring 15 within its bore. Finally, the second spacer plate 18 is pressed down until contact against element winding 17 is made trapping the end of the element wire against the contact ring 15. Additionally, the pitch is offset by 180 degrees on the upper element 17 so each winding of the top helix element 17 fits between the winding of the lower element 14. FIG. 8 illustrates this construction detail by removal of the spacer plates 16, 18. The view is from a vantage point above the element housing 19 looking straight down. FIG. 6, an exploded view illustration of the parts involved in assembly of the heater cartridge 29 contains the components necessary for connection of the heater element sub-assembly 20 of FIG. 5, to integrate into the novel nozzle heater-cooler 1. The heater element sub-assembly 20 is installed in the retainer 12. The bottom lip of the element housing 19 is coincident to the interior ledge of the retainer 12. Element power rods 21 are inserted into the retainer 12 and connected to the respective polarity on the element windings 14, 17. Dissimilar metal rods 22, 23, 24, 25 are installed in the retainer. Electrical contact between rods is made through the copper contact pad 13 in the perimeter of the element housing 19. Type J, K and T thermocouples are possible simply by selection of which two dissimilar metal rods 22, 23, 24, 25 are involved in the electrical connection to the controller used. The heater cartridge is potted with epoxy after installation of all the components required in the assembly. A thermo set adhesive is used for potting of the components due to ease of application, inherent structural integrity and thermal resistance to 400° F. after solidification. The diffuser 26 is installed after application of silicone form in place gasket to grooves cut into the parts outside diameter. Cartridge guide pins 27 are installed after diffuser 26 installation. The pins prevent rotation of the cartridge to ensure the integrity of the electrical connections and lock the diffuser 26 in place to secure it from movement during installation and removal of nozzle assemblies 2, 3, 4 in service. The cartridge o-ring 28 fits the groove in the upper flange of the heater cartridge 12, the o-ring is required to seal against the pressure of the gas used when convective cooling is required. A cartridge spring 11 is necessary to bias the heater cartridge upward it is installed in the groove cut under the flange of the heater cartridge 12.

FIG. 7 illustrates the heater element power rods 21 and thermocouple rods 22, 23, 24, 25 installed in the heater cartridge as they appear after potting. The parts occupy the same positions they would in service. The diffuser is omitted from the view only for the purpose of visual access. Normally, the sub-assembly would contain the diffuser, which serves to encase the heater power rods 21 and thermocouple rods 22, 23, 24, 25 from contact.

FIG. 6 a hollow cylindrically shaped cartridge assembly 29 with a concentric radial flange coincident to the top of the cylindrical surface with a concentric groove coincident to the exterior wall on the bottom surface of the flange where one side of a cartridge spring 11 coincident with the surface resides. The cartridge assembly 29 is capable of translation in the Z direction, to account for variation in tolerance in the manufacture of the reusable hub 3 or brazed nozzle 4. A flat circular heater element housing assembly 20 illustrated in FIG. 4, 19 and in exploded view FIG. 5, the element housing 19 contains the resistive elements 14, 17 that change the electrical energy via resistance to provide heat to the housing surface 19 of assembly 20 is coincident on the bottom side to the interior ledge formed from the small diameter hole that is cut through the counter bored circular housing diameter 19 interior of the cylindrically shaped cartridge 12. A second interior ledge in the larger diameter cylindrically shaped body 5 is formed from the small cartridge diameter hole 12 that is cut through and the outside diameter of the radial flange 12 counter bored interior. The opposite end of cartridge spring 11 applies force against this flange. This causes the cartridge to shift upwardly against the bias of cartridge spring 11. Ejection of the cartridge assembly 29 and cartridge spring 11 is prevented by main slide 35 that is installed perpendicular to the axis of the two concentric cylinders 5 and 12. The main slide 35 is contained in a slot formed by assembly of the lower body 5 and upper body 31, the two parts are held together by two grooved pins 6 pressed into holes cut through the two protrusions extending outward on the lower body 5 these grooved pins 6 extend through the cross section of the upper body 31. The clip assembly 34 is manufactured by brazing the right angle sections 32 to the clip body 33. A complete clip assembly 34 is inserted into the upper body 31 by pushing the assembly downward causing deflection of the integral cantilever spring formed from the two parallel grooves on the rearward portion of the clip body 33 and sliding the clip forward so the right angle sections 32 rest in the space formed by the circumferential groove cut into the grooved pins 6. The clip body 33 will sit adjacent to the raised flange that skirts the perimeter of the upper body 31 when assembled. Allowing the cantilever spring formed by the parallel grooves on the rearward portion of the clip body 33 to return to the flat position. When the clip has moved forward of the two raised protrusions on the edge of the upper body 31, this feature ensures the clip assembly 34 will remain in position positively locking the lower body 5, upper body 31, grooved pins 6, clip assembly 34 and interior parts together. The main slide 35 is inserted through the slot formed after assembly of the previously mentioned parts until the abutment on either side of the slide 35 contacts the stop resident in the lower body 5 portion of the assembly. The main slide spring 36 is inserted after the main slide 35 is inserted as previously mentioned, so one end fits into the chamfered counter-bore formed by assembly of the upper body 5 and lower body 31, the other end of the main slide spring 36 fits into notches cut into the top side of the interior oval hole cut longitudinally along the main slide 35 centerline. This positively locks the main slide into the assembly. The assembly procedure of the heater cooler to a disposable nozzle core and hub is quite simple. An operator merely depresses the main slide by placing forefinger and index finger against the curved protrusions on the inventive nozzle heater-cooler 1 and depresses the main slide with the thumb. The assembly is positioned under the reusable hub and disposable core or brazed nozzle version and slid upward until the bottom of the hub contacts the element housing causing the retainer assembly to move downward against the bias of the retainer assembly spring. If alignment with the groove is not proper the heater-cooler is merely slid vertically along the hub until the retainer is deflected sufficiently, the main slide is pushed into the groove by the bias of the main slide spring. If alignment is not proper, but, close the chamfer between reusable nozzle hub and hexagonal lower detail will help direct the main slide into the groove. The assembly of the two parts is a simple operation merely depressing the main slide and move the assembly upward vertically until the slide locks into the groove. The groove can be partial as in the reusable hub configuration or extend a full 360 degrees of rotation as in the brazed nozzle. In either case the assembly works equally well, however, the use of a large area in the groove has the advantage of stabilizing and providing additional strength to the resulting assembly. In addition to the merits associated with thermal performance the biased retainer contacts the bottom of the nozzle and enhances the stability of the system.

While the invention has been described with reference to a particular embodiment thereof, those skilled in the art will be able to make various modifications to the described embodiment of the invention without departing from the true spirit and scope thereof. It is intended that all combinations of elements and steps, which perform substantially the same function in substantially the same way to achieve substantially the same result, be within the scope of this invention.

What is claimed is:

1. A nozzle heater-cooler assembly, comprising:
   a) a hollow cylindrically shaped cartridge that contains an electrical element that contacts flat against the bottom surface of a housing;
   b) a spring biasing said cylindrically shaped cartridge to lower as measured from base of said nozzle hub to enable a change in position of said electrical element;
   c) a second larger diameter cylindrically shaped body that said cylindrically shaped cartridge and said spring are fit surrounds the cartridge and spring;
   d) a central opening means for allowing said heater cooler assembly to slide on body of said nozzle and moveable from an unlocked position with main slide retracted from said nozzle with a groove to a locked position with said main slide extending into said nozzle with a groove;
   e) an electrical path through metallic rods and springs to enable conductors to fit in a small space and allow movement by translation of the electrical path along one axis a series of dissimilar metal rods with a common heat conduction pad that enables electrical connection of all said dissimilar metal rods;
   f) a convective cooler design for said nozzle that simultaneously directs pressurized gas along each face of a hexagonally shaped hub;
   g) a resistive element design composed of two elements on parallel planes, electrically connected in a series circuit.

2. The nozzle heater-cooler assembly of claim 1, wherein a change in position of said electrical element divided into the perimeter of the heated space exceeds one.

3. The nozzle heater-cooler assembly of claim 1, wherein said second larger diameter cylindrically shaped body that said cartridge and said spring are fit is about 50 mm in diameter and 25 to 40 mm in height.

4. The nozzle heater-cooler assembly of claim 1, wherein said hollow cylindrically shaped cartridge that contains said electrical element that contacts flat against the bottom surface of said housing is between 8 mm to 20 mm in diameter.

5. The nozzle heater-cooler assembly of claim 1, wherein said resistive element design composed of two elements on parallel planes, electrically connected in a series circuit are helix shaped windings of high resistance metallic conductor with a resistance somewhere between 50 and 250 ohms.

6. The nozzle heater-cooler assembly of claim 1, wherein said central opening means for allowing said heater-cooler assembly to slide on body of said nozzle and moveable from an unlocked position with main slide retracted from said nozzle with a groove to a locked position with said main slide extending into grove on said nozzle is a flat guillotine mounted slide perpendicular to the axis of the cylindrical body occupying a slot through the part preventing egress of said cylindrically shaped cartridge and said spring that biases said cylindrically shaped cartridge with a groove.

7. The nozzle heater-cooler assembly of claim 1, wherein said central opening means for allowing said heater-cooler assembly to slide on body of said nozzle and moveable from an unlocked position with main slide retracted from said nozzle with a groove to a locked position with said main slide extending into said groove on said nozzle hub is locked by an outwardly extended retaining member.

8. The nozzle heater-cooler assembly of claim 1, wherein said hollow cylindrically shaped cartridge that contains said electrical element that contacts flat against the bottom surface of a thermally conductive, electrically insulating housing resting on an interior lip extending around the inside perimeter of said cylindrically shaped cartridge, conducts heat into the enclosed space containing and surrounding said nozzle.

9. The nozzle heater-cooler assembly of claim 1, wherein said second larger diameter cylindrically shaped body that said cylindrically shaped cartridge and said spring are fit utilizes o-rings to seal the interface between said cylindrically shaped cartridge and said larger diameter cylindrically shaped body.

10. The nozzle heater-cooler assembly of claim 1, wherein said resistive element design composed of two elements on parallel planes, electrically connected in series are out of phase 180° in comparison of a lower element winding start to a upper element winding start around a concentric cylinder.

11. The nozzle heater-cooler assembly of claim 1, wherein said series of dissimilar metal rods that contact a common heat conduction pad which enables electrical connection of all the dissimilar rods to form a series circuit pair wise, any two said dissimilar metal rods will produce discrete thermocouple types.

12. The nozzle heater-cooler assembly of claim 1, wherein said, convective cooler design for a nozzle that simultaneously directs pressurized gas along each face of said hexagonal shaped hub uses a diffuser to direct and distribute cooling gas to each face of the hexagonally shaped nozzle base.

13. The nozzle heater-cooler assembly of claim 1, wherein said central opening means for allowing said heater-cooler assembly to slide on body of said nozzle and moveable from an unlocked position with said main slide retracted from said nozzle with a groove to a locked position with said main slide extending into said nozzle with a groove and has an integral abutment and said lower body includes an abutment that are coincident when lock is in the normally closed position and are closely spaced when locked to said nozzle body.

14. The nozzle heater-cooler assembly of claim 1, wherein said central opening is sealed around the nozzle body outside diameter using a seal clamped to the heater-cooler upper body.

15. The nozzle heater-cooler assembly of claim 1, wherein said electrical path through said metallic rods and said springs permits conductors to fit in a small space and allow movement by translation of said electrical path along one axis, pins from the integral connector also function as the cantilever springs that are in intimate contact with the rods in each groove to enable construction of sliding discrete electrical connections.

16. The nozzle heater-cooler assembly of claim 1, wherein said resistive element design composed of two elements on parallel planes, about 0.1 mm to 2 mm but more preferably 0.1 mm to 1 mm apart.

17. The nozzle heater-cooler assembly of claim 1, wherein said central opening means for allowing said heater-cooler to slide on body of said nozzle hub and moveable from an unlocked position with said main slide retracted from said nozzle hub groove to a locked position with said main slide extending into groove on said nozzle hub with enough force to resist any strong movement but allow rotation so as not to exert torque on said nozzle hub.

18. A nozzle hub for connection and support of a nozzle heater-cooler has a groove that extends concentrically around the hub body circumference, which can be continuous or intermittent in 360° of rotation at a distance that exceeds the depth of an element housing installed in a spring biased cartridge.

19. A nozzle heater-cooler apparatus, comprising:
  a. an input port for cooling gas flow into the heater-cooler apparatus;
  b. an integral electrical connector molded into the lower body of the apparatus for electrical input and temperature data output;
  c. connection logistics for the heater-cooler apparatus require a large diameter cylindrically shaped body to integrate triangular protrusions opposite a main slide.

20. The nozzle heater-cooler apparatus of claim 19, connection logistics require said large diameter cylindrically shaped body to integrate said triangular protrusions opposite said main slide, the triangular protrusions provide structure to form generous radii across, large enough to fit index finger and forefinger to enable use of thumb for actuation of said main slide.

* * * * *